(12) United States Patent
Bagnall

(10) Patent No.: US 8,633,852 B2
(45) Date of Patent: Jan. 21, 2014

(54) SIGNAL VERIFICATION

(75) Inventor: Peter Bagnall, Bristol (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 143 days.

(21) Appl. No.: 13/237,611

(22) Filed: Sep. 20, 2011

(65) Prior Publication Data

US 2012/0072112 A1 Mar. 22, 2012

(30) Foreign Application Priority Data

Sep. 20, 2010 (GB) .................................. 1015678.4

(51) Int. Cl.
*G01S 19/08* (2010.01)

(52) U.S. Cl.
USPC ............ 342/357.23; 342/357.22; 342/357.58; 342/357.34; 342/357.44

(58) Field of Classification Search
None
See application file for complete search history.

(56) References Cited

U.S. PATENT DOCUMENTS

| | | | | |
|---|---|---|---|---|
| 4,928,107 | A * | 5/1990 | Kuroda et al. | 342/357.67 |
| 5,430,657 | A * | 7/1995 | Kyrtsos | 701/469 |
| 5,504,492 | A * | 4/1996 | Class et al. | 342/357.31 |
| 5,969,669 | A * | 10/1999 | Ishikawa et al. | 342/357.2 |
| 6,049,304 | A * | 4/2000 | Rudel et al. | 342/357.34 |
| 6,085,128 | A * | 7/2000 | Middour et al. | 701/13 |
| 6,133,872 | A * | 10/2000 | Mitchell et al. | 342/357.31 |
| 6,233,507 | B1 * | 5/2001 | May | 701/13 |
| 6,243,648 | B1 * | 6/2001 | Kilfeather et al. | 701/485 |
| 7,737,888 | B2 * | 6/2010 | Remondi | 342/357.45 |
| 7,956,803 | B2 * | 6/2011 | Thomson et al. | 342/357.59 |
| 8,032,301 | B2 * | 10/2011 | van Diggelen et al. | 701/531 |
| 8,120,529 | B2 * | 2/2012 | Bar-Sever et al. | 342/357.66 |
| 8,134,500 | B2 * | 3/2012 | van Diggelen et al. | 342/357.42 |
| 8,155,875 | B2 * | 4/2012 | Onda | 701/531 |
| 8,212,719 | B2 * | 7/2012 | Van Diggelen et al. | 342/357.42 |
| 2002/0188403 | A1 * | 12/2002 | LaMance et al. | 701/213 |
| 2006/0187116 | A1 * | 8/2006 | Uozumi | 342/357.06 |
| 2007/0205942 | A1 | 9/2007 | Xie et al. | |
| 2009/0002231 | A1 | 1/2009 | Xie et al. | |
| 2010/0060516 | A1 * | 3/2010 | Onda | 342/357.02 |
| 2010/0103031 | A1 * | 4/2010 | Onda | 342/357.02 |
| 2010/0103041 | A1 * | 4/2010 | Tomita | 342/357.15 |
| 2011/0285586 | A1 * | 11/2011 | Ferguson | 342/357.45 |
| 2012/0072112 | A1 * | 3/2012 | Bagnall | 701/531 |

(Continued)

FOREIGN PATENT DOCUMENTS

| | | |
|---|---|---|
| GB | 2271902 A | 4/1994 |
| GB | 2295063 A | 5/1996 |

(Continued)

OTHER PUBLICATIONS

UK Search Report mailed Jan. 10, 2011 for GB1015678.4 (4 pages).

*Primary Examiner* — Thomas Tarcza
*Assistant Examiner* — Richard Goldman
(74) *Attorney, Agent, or Firm* — Gardere Wynne Sewell LLP

(57) ABSTRACT

A first position of a satellite is calculated at a first time in dependence on received orbit data corresponding to an orbit path of the satellite. An an orbit path of the satellite is modeled from the first position at the first time to a second time to determine a second position of the satellite at the second time. A third position of the satellite is then calculated at the second time in dependence on the received orbit data. The second position and third position are compared to determine a validity of the orbit data.

24 Claims, 7 Drawing Sheets

(56) References Cited

U.S. PATENT DOCUMENTS

2012/0154210 A1* 6/2012 Landau et al. ........... 342/357.23
2012/0166081 A1* 6/2012 Uchida ........................ 701/468
2012/0253563 A1* 10/2012 Lobo .............................. 701/13

FOREIGN PATENT DOCUMENTS

| JP | 2004279183 A | 10/2004 |
|---|---|---|
| JP | 2009068927 A | 4/2009 |
| WO | WO-2008038919 A1 | 4/2008 |

* cited by examiner

SIGNAL VERIFICATION

PRIORITY CLAIM

This application claims priority from Great Britain Application for Patent No. 1015678.4 filed Sep. 20, 2010, the disclosure of which is hereby incorporated by reference.

TECHNICAL FIELD

The present invention relates to global navigational satellite systems and in particular but not exclusively to the verification received by receivers of such systems.

BACKGROUND

Global navigational satellite systems (GNSS) exist in which mobile terrestrial satellite receivers may calculate their position based on data received from satellites. The terrestrial satellite receiver receives information relating to a satellite position broadcast from the satellite. This information may include information describing an orbit of the satellite and timing information for the satellite. The terrestrial satellite receiver calculates its position using this information. Examples of GNSS systems are the Global position system GPS, Galileo, GloNass and Compass.

Recently GNSS receivers have been introduced which are able to provide their positional data to other entities. These receivers typically have a modem embedded in the receiver capable of communicating using cellular (GPRS), radio or satellite links. These receivers have application in the security field in that they enable the whereabouts of a vehicle to be tracked. They are also applicable to the emergency services field where they may be used to transmit mayday and positional data. More recently the use of GNSS receivers in so-called electronic fee collection systems for example toll fees, road tax and congestion charges has been suggested.

The transmitted positional data signal should be robust. For example, a disruption of the positional data signal may prevent a stolen vehicle from being tracked. Additionally, the payment of road tax, toll fees and congestion charges may be avoided by interfering with the positional data signal.

SUMMARY

According to a first aspect there is provided a method comprising: calculating a first position of a satellite at a first time in dependence on received orbit data corresponding to an orbit path of the satellite; modeling an orbit path of the satellite from the first position at the first time to a second time to determine a second position of the satellite at the second time; calculate a third position of the satellite at the second time in dependence on the received orbit data; and comparing said second position and said third position to determine a validity of the orbit data. The orbit data may comprise orbit parameters for predicting an orbit path of the satellite for a segment of flight. The modeling may be based on an orbit propagation model. The orbit propagation model may take into account the effects of at least one of: at least one gravitational body and solar pressure on the orbit path.

The orbit data may be received at a third time which falls within a period for which the orbit data describes a segment of the satellites orbit path. The first time may be a time before said third time at which the orbit data is received and the second time may be a time after said third time.

The first time may be the start of the period for which the orbit data describes a segment of the satellites orbit path and the second time may be the end time of the period for which the orbit data describes a segment of the satellites orbit path and wherein the first position may be a position of the satellite at the start of the period for which the orbit data describes a segment of the satellites orbit path and the second and third positions may be projected positions of the satellite at the end of the period for which the orbit data describes a segment of the satellites orbit path. The first and third positions may be calculated using position and velocity equations with orbit parameters from the orbit data as input parameters.

The step of comparing the second and the third position estimates to determine validity of the orbit data may comprises: determining an error corresponding to a difference the second position and the third position. The method may further comprise determining information about the validity of the orbit data by comparing said error with a threshold. The method may further comprise transmitting a signal comprising information about the validity of the orbit data.

According to a second aspect, there is provided a computer readable medium including computer instructions for: calculating a first position of a satellite at a first time in dependence on received orbit data corresponding to an orbit path of the satellite; modeling an orbit path of the satellite from the first position at the first time to a second time to determine a second position of the satellite at the second time; calculating a third position of the satellite at the second time in dependence on the received orbit data; and comparing said second position and said third position to determine a validity of the orbit data.

According to a fourth aspect, there is provided an apparatus comprising: a processor configured to: calculate a first position of a satellite at a first time in dependence on received orbit data corresponding to an orbit path of the satellite; model an orbit path of the satellite from the first position at the first time to a second time to determine a second position of the satellite at the second time; calculate a third position of the satellite at the second time in dependence on the received orbit data; and compare said second position and said third position to determine a validity of the orbit data.

The apparatus of the fourth aspect may be a GNSS receiver. The GNSS receiver may be a GPS, Galileo, GloNass, Compass or any other GNSS receiver.

According to a fifth aspect, there may be provided an apparatus comprising: a processor configured to: receive an indication of a validity of orbit data; determine a validity of positional information associated with said orbit data based on said indication.

According to a sixth aspect, there is provided an apparatus comprising: processing mean for calculating a first position of a satellite at a first time in dependence on received orbit data corresponding to an orbit path of the satellite, modeling an orbit path of the satellite from the first position at the first time to a second time to determine a second position of the satellite at the second time, calculating a third position of the satellite at the second time in dependence on the received orbit data and comparing said second position and said third position to determine a validity of the orbit data.

BRIEF DESCRIPTION OF THE DRAWINGS

Some embodiments will now be described, by way of example only, with reference to the accompanying drawings in which.

DETAILED DESCRIPTION OF THE DRAWINGS

Figure 1:
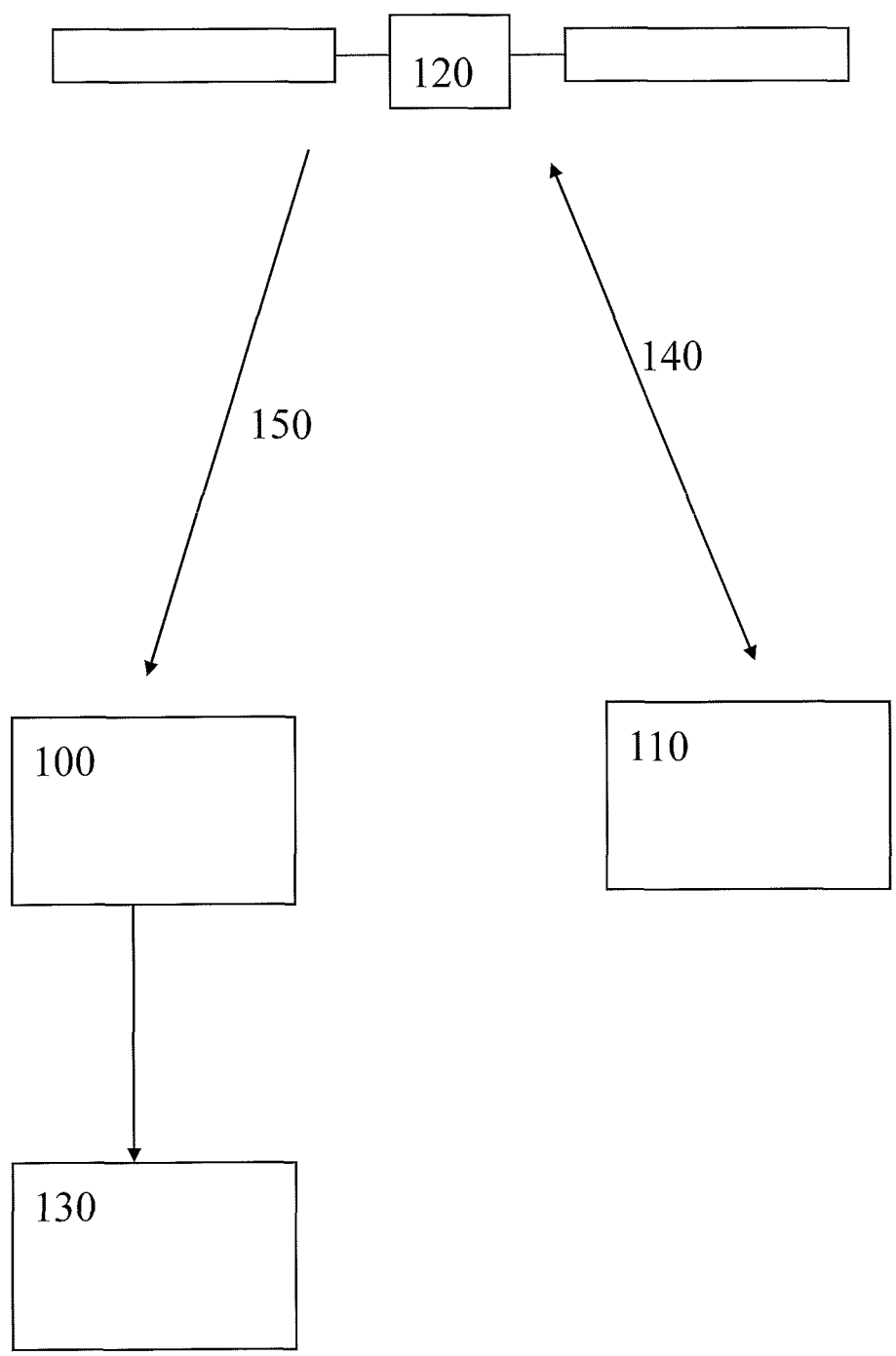
FIG. 1 shows a component diagram of a global navigation satellite system incorporating an embodiment.

FIG. 1 shows components of a global navigation satellite system GNSS in which embodiments may be implemented. A ground control station 110 is shown with an uplink 140 to a satellite 120. Although only one satellite 120 is shown in FIG. 1, it will be appreciated that a GNSS may comprise multiple satellites. The satellite 120 is shown with a satellite downlink 150 to facilitate communication with a GNSS receiver 100. The GNSS receiver 100 is further linked to a data receiver 130 via a communication link 160. The communication link may be via any suitable communication means, for example the GNSS receiver 100 may be capable of communicating using cellular (GPRS), radio or satellite links.

The ground control station 110 is a central controller and coordinator for the satellite 120 and may transmit control information for the satellite over uplink 140. The ground control station may be further capable of receiving information from satellite 120 and may have the ability to analyze this information with regards to the functioning of the satellite 120 and the GNSS system. The ground control station 110 may be in communication with multiple satellites in the GNSS system and provide similar function as for the satellite 120.

The ground control station 110 may also be capable of generating orbit data for the satellite 120. The orbit data is used to accurately predict an orbit path of the satellite 120 for a segment of the satellite's 120 flight. The orbit data may predict the position of the satellite 120 against time along a section of the satellites orbit path and may provide an accurate prediction of position along that section of the orbit path. For example the orbit path may be determined by the orbit data to an accuracy within a few meters. New orbit data may be generated for each subsequent section of the orbit path.

In order to generate the orbit data, the ground control station 110 may use a highly accurate orbit model to model the satellites 120 orbit path from which orbit data is determined. The orbit data may take the form of orbit parameters which form input parameters for analytic equations capable of calculating a position of the satellite 120. The ground control station 110 may transmit the orbit data to the satellite 120 via the uplink 140. Orbit data may be uploaded for each section of the satellites 120 flight, with new orbit data being uploaded for each subsequent section of the orbit path.

Once the satellite 120 has received the orbit data from the ground control station 110, the satellite 120 broadcasts the orbit data to any GNSS receivers that are within the range of satellite 120. For example, the satellite 120 may transmit the orbit data to the GNSS receiver 100 in the form of a data packet. The GNSS receiver 100 receives the orbit data from the satellite 120 over communication link 106. The satellite 120 also broadcasts satellite timing information which the GNSS receiver 100 may receive.

The GNSS receiver 100 may use the received orbit data and timing information from the satellite 120 to calculate a position of the GNSS receiver 100. In some GNSS systems, the GNSS receiver 100 calculates its position based on the position of satellite 120 and the distance of the receiver from the satellite 120. In these systems the position of satellite may be calculated using the orbit data and the satellite timing information in an analytic equation such as a Kepler equation and the distance from the satellite determined using the satellite timing information. The GNSS receiver 100 may also be capable of transmitting the calculated position to a data receiver 130.

The data receiver 130 may use the calculated position in an application. For example the data receiver 130 may be an emergency receiver and may use the received calculated position to dispatch emergency services. Alternatively the data receiver 130 may form part of an electronic fee collection system and use the received calculated position to determine and or charge a fee. It will be appreciated that the data receiver may use the calculated position or an indication thereof for any suitable purpose.

In addition to the above described functionality, the GNSS receiver 100 is also capable of determining a validity of the orbit data received from the satellite 120. For example, the GNSS receiver 100 of embodiments may be capable of determining whether a received orbit data is genuine data from the satellite 120 or if it is a spoof signal originating from for example a dishonest third party and carrying false orbit information. A typical GNSS receiver would calculate an erroneous position based on the false orbit information. Embodiments may determine whether the orbit data received corresponds to the actual orbit of the satellite 120.

Figure 2:
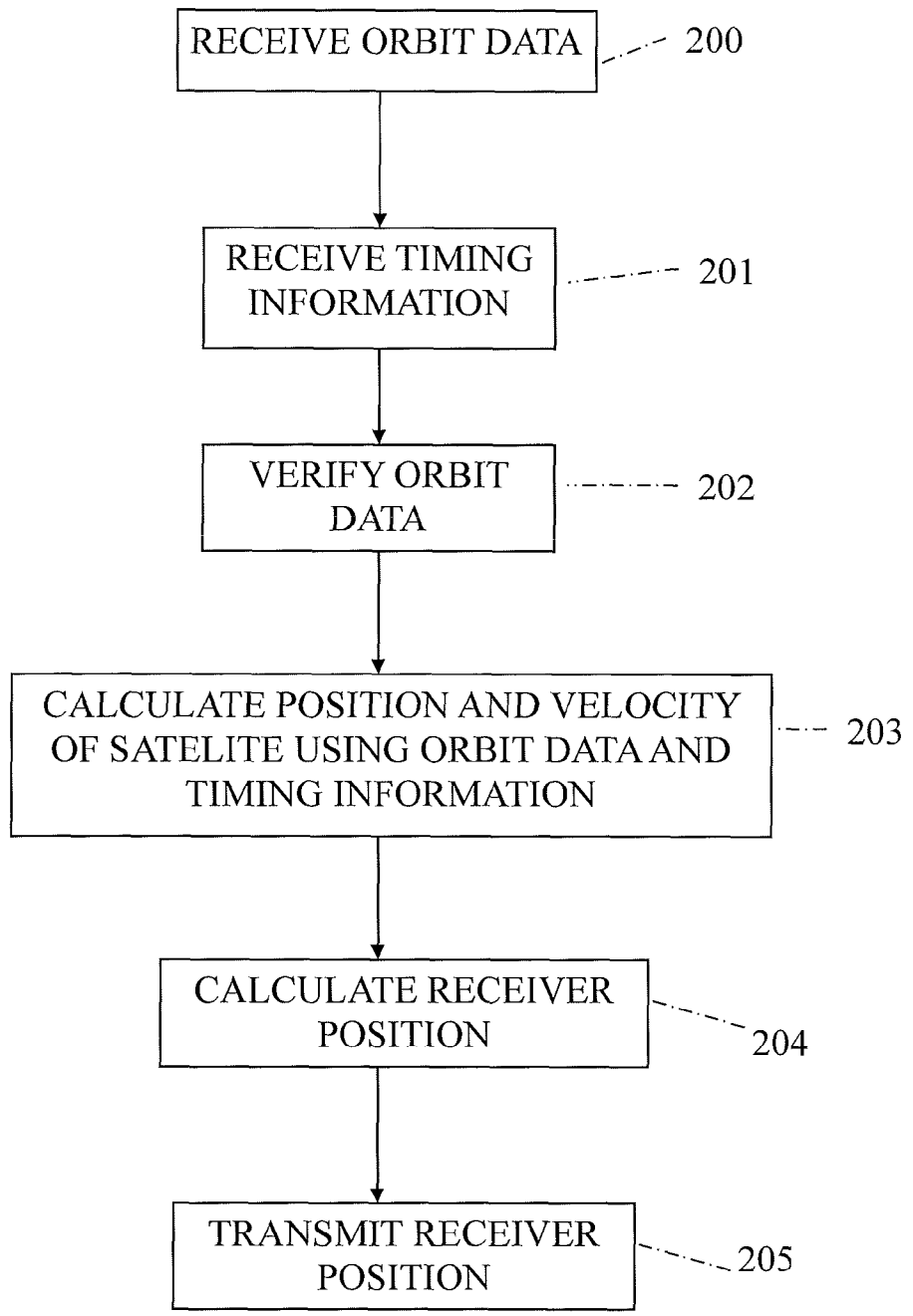
FIG. 2 shows a flow chart of the method of an embodiment.

FIG. 2 shows the method steps carried out by a GNSS receiver 100 capable of verifying orbit data in accordance with an embodiment of the present invention and the system as shown in FIG. 1.

At step 200 in FIG. 2, the orbit data is received by the GNSS receiver 100. At the step 201 timing information is received from the satellite 120. The timing information may consist of a time at which the satellite transmitted the timing information. In some embodiments the timing information is encoded in such a way that the GNSS receiver 100 may recognize the identity of the satellite 120 from the encoding. The GNSS receiver 100 receives the timing information and notes the time of the GNSS receiver 100 at which the timing information is received. This allows the GNSS receiver 100 to calculate the propagation time of the timing information from the satellite to the receiver and subsequently the distance of the GNSS receiver 100 from the satellite 120.

At step 202, the orbit data is verified. The GNSS receiver 100 may determine whether or not the orbit data corresponds to the actual orbit of the satellite 120 or if the orbit data is likely to have originated from another source or be false data.

At step 203 a position and velocity of the satellite 120 at a time corresponding to the timing information is calculated. The orbit data may be used as input parameters in a position and velocity equation. These parameters take into account the various effects on the satellite that may influence its orbit. In some GNSS system Kepler equations are used which use the orbit data as input parameters to solve for a position and velocity of the satellite at a time indicated by the received timing information from the satellite 120. In this manner, the position and velocity of the satellite 120 can be calculated.

At step 204, the calculated position and velocity of the satellite 120 is used to calculate a position of the GNSS receiver 100. As mentioned with reference to step 201, this position may be calculated by using for example a propagation time of the timing information from the satellite 120 to the GNSS receiver 100 to calculate the position of the GNSS receiver 100 relative to the satellite 120. It will also be appreciated that the position and a velocity of the GNSS receiver 100 may be calculated with reference to more than one satellite and that the GNSS receiver may be in communication with more than one satellite at any given time.

At step 205, the calculated position of the GNSS receiver 100 is transmitted to the data receiver 130. It will be appreciated that this step is optional and that the calculated position of the GNSS receiver 100 may only be transmitted at certain intervals or under certain conditions. For example, the position may only be transmitted when a certain geographical area has been entered. Alternatively the position of the GNSS receiver 100 may be stored and accumulated position information may be transmitted or downloaded at specified times.

Figure 3:
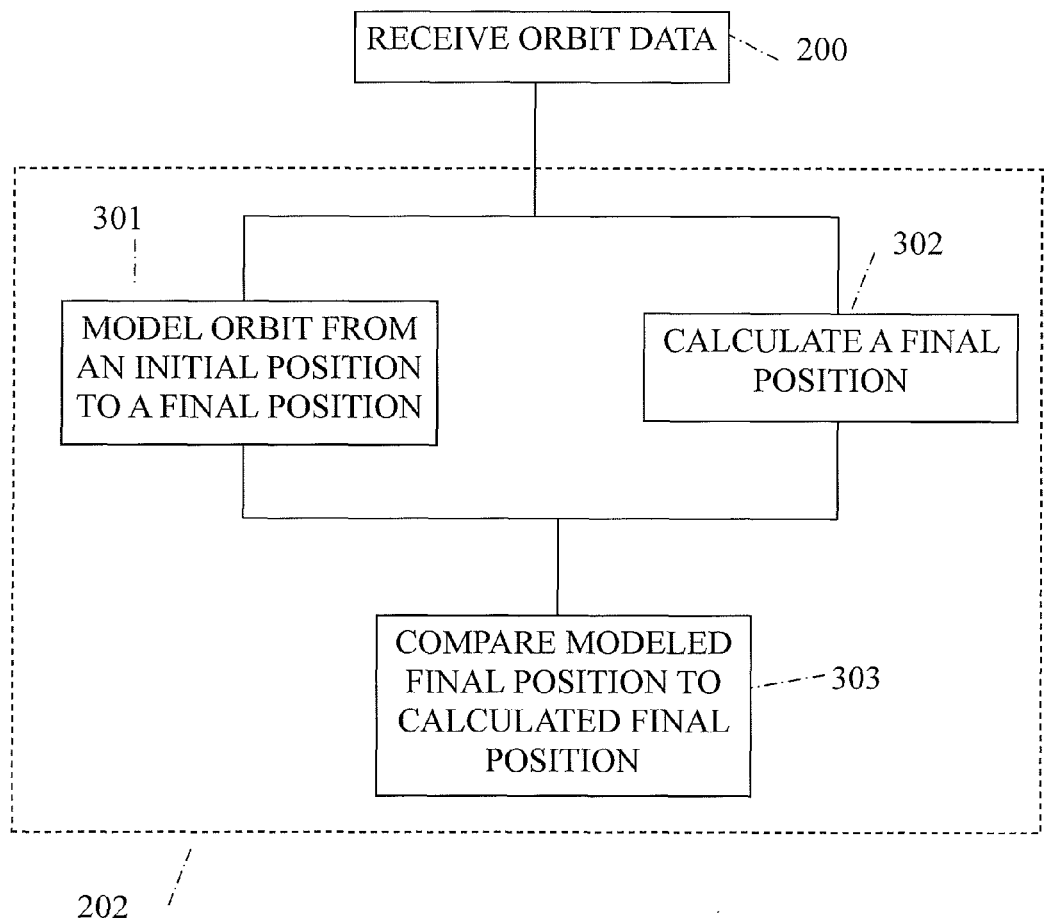
FIG. 3 shows a flow chart of the verification step of FIG. 2.

FIG. 3 shows an embodiment of a method of verifying orbit data and may correspond for example to step 202 in FIG. 2.

At step 200 in FIG. 3 the orbit data is received. The method then proceeds to block 202 indicated by a dashed line. Block 202 in FIG. 3 may correspond to the verify orbit data step 202 in FIG. 2 and described above. Within block 202, the received orbit data is input into step 301 and 302. These steps may be carried out in parallel. Alternatively, the steps may be carried out sequentially.

At step 301, starting from an initial position at an initial time, the satellite orbit is modeled until the satellite reaches a final position at a final time. The model of the satellites orbit path is determined by modeling influences on the orbit by external factors. For example, the orbit model may include models for acceleration induced by the Earth, Moon and Sun gravity and solar radiation.

In one embodiment the orbit path of the satellite may be propagated by using an accurate orbit model. The accurate orbit model may use an initial position of the satellite along with the models for acceleration due to external factors to model the propagation of the satellite through its orbit to a final position. The effect of external factors on the satellite may be an effect on the acceleration of a satellite and can be calculated based on the initial position of the satellite and models for the acceleration of the satellite due to these external factors.

The accurate orbit model may make use of known models of acceleration and the model may validly describe an entire orbit of a satellite. The accurate orbit model may not require updating during the path of a satellite and hold true for the entirety of the satellites orbit. The accurate orbit model may be pre-loaded to the GNSS receiver 100. Alternatively the accurate orbit model may be transmitted to the GNSS receiver 100. The accurate orbit model may be capable of modeling any orbit based on the initial position of the satellite.

An example of an algorithm that may be used to model the satellites orbit according to the above paragraphs is an orbit propagation model. An example of such an orbit propagation model is:

$$\vec{P}_{(t)} = \vec{P}_0 + \vec{V}_0 \cdot t + \iint (\vec{a}_{earth} + \vec{a}_{sun} + \vec{a}_{moon} + \vec{a}_{solar\_pressure} + \vec{a}_{others}) dt$$

$P_0$ and $V_0$ represent the initial starting position and velocity of the satellite at an initial or starting time of the model. The equation includes models for acceleration induced by external factors such as the acceleration of the satellite induced by Earth $a_{earth}$, Sun $a_{sun}$ and Moon $a_{moon}$ gravity, solar pressure $a_{solar\_pressure}$ and other effects $a_{others}$.

The models for acceleration are integrated to calculate their influence on the position and velocity of the satellite 120. Any suitable method of integration may be used. For example an integration method such as Runge Kutta may be used to arrive at a predicted position and velocity for the satellite at some time in the future.

The initial position of the satellite includes an initial position and an initial velocity at an initial time. This may be determined in any appropriate manner. For example the initial position may be determined using the received orbit data in an analytic equation. Alternatively, if the satellite 120 had been tracked at the initial time, the initial position may be stored at the receiver or the initial position may be otherwise known.

At step 301 a final position of the satellite at a corresponding final time is predicted by modeling the satellites 120 orbit path. The modeled final position is then passed to step 303 which will be discussed later.

As previously mentioned, the orbit data is also input to step 302. At step 302 the orbit data is used to form input parameters for analytic equations capable of calculating a position of the satellite 120. In some embodiments similar equations used to calculate a current position of the satellite as for example in step 203 of FIG. 2. The equations used may correspond to Keplers equations where the orbit data forms input parameters relating to various characteristics of the satellites orbit.

Examples of the parameters from the orbit data may correspond to characteristics of the orbit such as: a square root of semimajor axis, eccentricity, inclination angle, longitude of the ascending node, argument of perigee, mean anomaly, rate of change of the inclination angle, rate of change of the longitudinal and ascending node, mean motion correction, amplitude of cosine correction to argument of latitude, amplitude of sine correction to argument of latitude, amplitude of cosine correction to orbital radius, amplitude of sine correction to orbital radius, amplitude of cosine correction to inclination angle and amplitude of sine correction to inclination angle. However it will be appreciated that these parameters depend on the GNSS system and different or other parameters or combinations thereof may be used.

The equations with the orbit parameters as input parameters also use timing information from the satellite 120 to solve for a position and velocity of the satellite. At step 302, the input parameters and a time corresponding to the final time in step 301 is input into the equations and a final position of the satellite is calculated The calculated final position may correspond to both a position and velocity of the satellite 120. The calculated final position is passed onto to step 303.

At step 303, the modeled final position and the calculated final position are compared to determine a difference between the modeled and calculated positions. If the difference between the modeled and calculated positions for the satellite at the final time is greater than a certain threshold, it is likely that the orbit data is not genuine. If the difference between the modeled and calculated positions is below a certain threshold, it is likely that the orbit data is genuine.

It will be appreciated that the modeled and calculated positions will not be identical even when the orbit data is genuine as the orbit propagation model is approximate and may be less accurate than a position determined by the analytic equation. At step 303 a determination is made whether the orbit data can be verified as genuine based on the difference between the modeled and calculated positions in relation to the threshold. It will be appreciated that this determination may determine that the orbit data is valid or invalid or may be a probability of the orbit data being valid or invalid.

The determination made at step 303 may then be passed on to further steps, for example step 203 of FIG. 2 or may be passed onto other circuitry. In another example, no indication of a validity of the orbit data may be made at this point.

Figure 4:
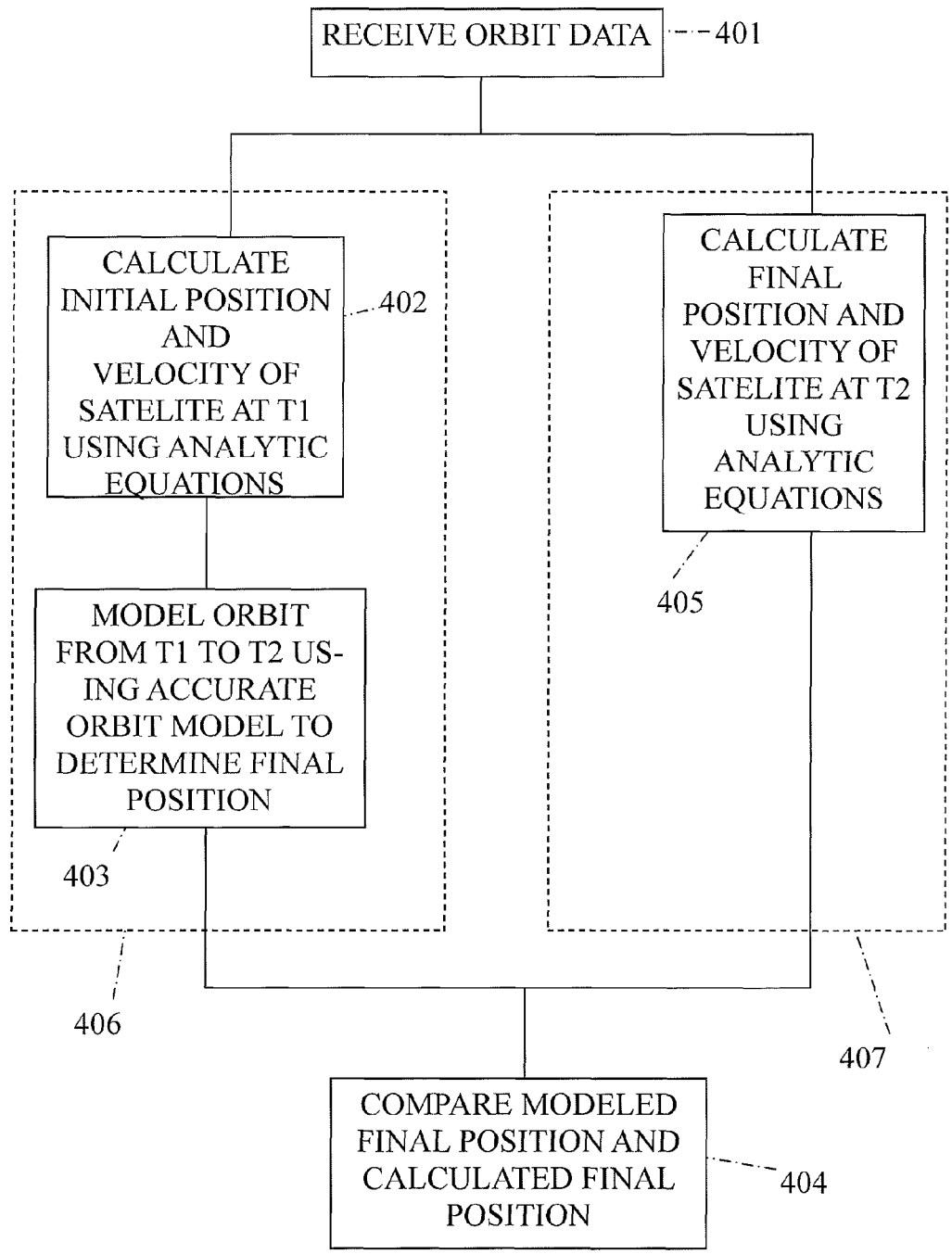
FIG. 4 shows a flow chart of the detailed method of an embodiment.

FIG. 4 shows an embodiment of the functional steps that may correspond to an embodiment of the verify orbit data step 202 of FIG. 2 and the method of FIG. 3.

At step 401, orbit data is received by the GNSS receiver 100 from the satellite 120. In some embodiments this orbit data may be ephemeris data determined by the ground control station 110 and describing a segment of the satellite 120 orbit. The orbit data is passed onto a branch indicated by dashed block 406 and to a branch indicated by dashed block 407. Branch 406 may correspond to step 301 of FIG. 3, while branch 407 may correspond to step 302 of FIG. 2.

At branch 406, an initial position and an initial velocity at an initial time is calculated for the satellite 120 using the orbit data. In this example, the Kepler equations using orbit parameters from the orbit data as input parameters are used. The initial time for which the position and velocity of the satellite is calculated is a time previous to the reception of the orbit data.

As discussed above, orbit data accurately describes an orbit path for a section of a satellites orbit. The orbit data is retroactive, that is, the orbit data accurately describes the orbit path of a satellite for a period prior to its reception at the GNSS receiver and for a period afterward. The initial time falls within the period prior to the reception of the orbit data. In a specific example, the initial time may be the start of the time period for which the orbit data accurately described the section of the satellites orbit.

Once the initial position and velocity of the satellite is calculated using the position and velocity equations, the initial position and velocity is passed onto step 403.

At step 403, an orbit propagation model is used to model the path of the satellite from the calculated initial portion and velocity to a final position and velocity at a final time. The final time is a time after the reception of the orbit data. In a specific example, the final time may be the end of the time period for which the orbit data accurately described the section of the satellites orbit. The orbit propagation model models the orbit path of the satellite using models for the acceleration induced by various external factors on the satellite. This final position and velocity from the orbit model propagation model is a first position passed onto block 404.

At branch 407, the orbit data forms input parameters for a position and velocity equation. This position and velocity equation may be a Kepler equation as in step 402. It will be appreciated that the same algorithm and apparatus may be used for steps 402 and 405. The Kepler equation at step 405 calculates a position and velocity of the satellite 120 at a time after the reception of the orbit data. This time corresponds the final time used for calculation in step 403 and accordingly, in a specific example, the final time may be the end of the time period for which the orbit data accurately described the section of the satellites orbit. The position and velocity calculated at step 405 is a second position passed onto block 404.

Once the first and second positions are passed onto step 404, they are compared to determine a difference between the first and second positions. The difference is compared to a threshold value and based on this comparison a determination is made as to whether the orbit data may be verified as genuine orbit data.

In embodiments, the threshold corresponds to a reasonable difference between the final position calculated by orbit data and analytic equation and the final position modeled by the orbit propagation model for a satellite 120. The threshold may correspond to an expected difference between the two final positions if the orbit data is trusted. If the orbit data is 'spoofed' the calculated final position and modeled final position will differ by an amount greater than the threshold as the spoof data may give a realistic position at a single time but will not correspond to a segment of a satellites orbit.

In some embodiments the threshold is value in meters by which the two final positions may vary. In specific examples the threshold may be chosen from a range of 20 to 30 meters however it will be appreciated that the threshold is dependent on the application of the invention and may vary according to requirements such as accuracy or probability of spoofing. In other embodiment, the threshold may be a percentage value by which the two final positions may vary. In other embodiments the threshold may be a range of thresholds, each corresponding to a probability of the orbit data being spoofed.

Figure 5:
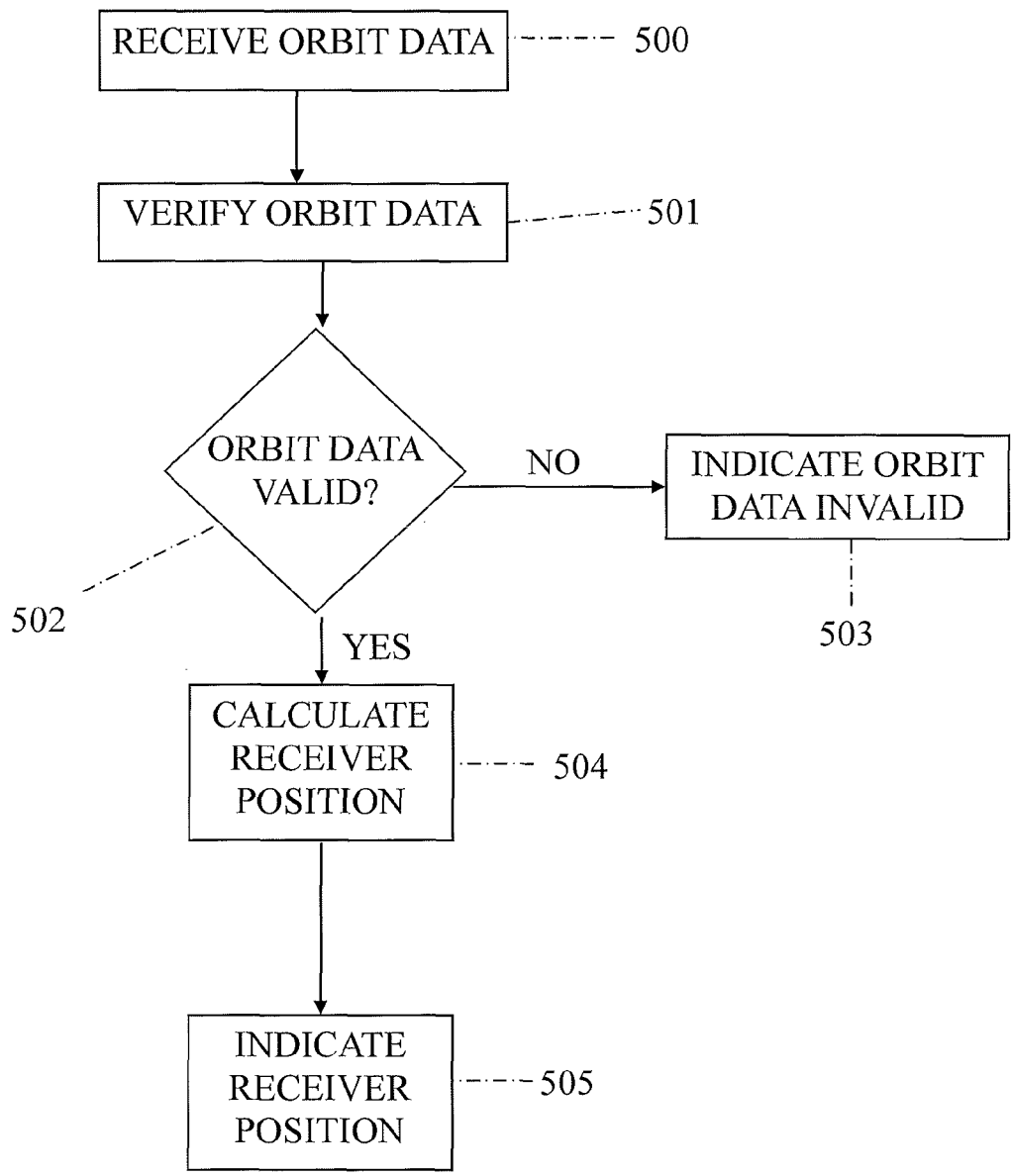
FIG. 5 shows a flow chart of an example implementation of an embodiment.

FIG. 5 shows an example embodiment of the present invention incorporating the method of verifying the orbit data as discussed in relation to the previous figures into a system where position information is used by a further entity.

At step 500 orbit data is received. This step may correspond to step 200 of FIGS. 2 and 3. The orbit data is verified at step 501. Once again this step may correspond to step 202 of FIGS. 2 and 3.

At step 502, it is determined whether the orbit data is valid. If the orbit data is not valid the method proceeds to step 503 where it is indicated that the orbit data is invalid. If the orbit data is valid, the method continues to step 504 where the position of the GNSS receiver 100 is calculated. Step 505 then provides an indication of the position of the GNSS receiver 100. It will be appreciated that the position of the GNSS receiver 100 may be determined simultaneously to step 502 or be determined as part of step 502.

At step 502, a signal may be output indicating that the orbit data is valid or invalid. Alternatively a signal outputting the probability of the signal being invalid is output. Alternatively a signal may only be output if the orbit data is determined to be invalid or only when the orbit data is determined to be valid. As discussed, an indication of the orbit data validity may not be output at all and may be stored for download or transmission only at specified times.

At step 505, the GNSS receiver 100 may send both the determined position of the GNSS receiver 100 and the indication of the validity of the orbit data signal to the data receiver 130. Alternatively, the determined position of the GNSS receiver 100 may be sent to one data receiver and the indication of the validity of the orbit data signal to another. Alternatively only the indication or the position may be sent, or no position or indication may be sent and instead stored for further access.

Figure 6:
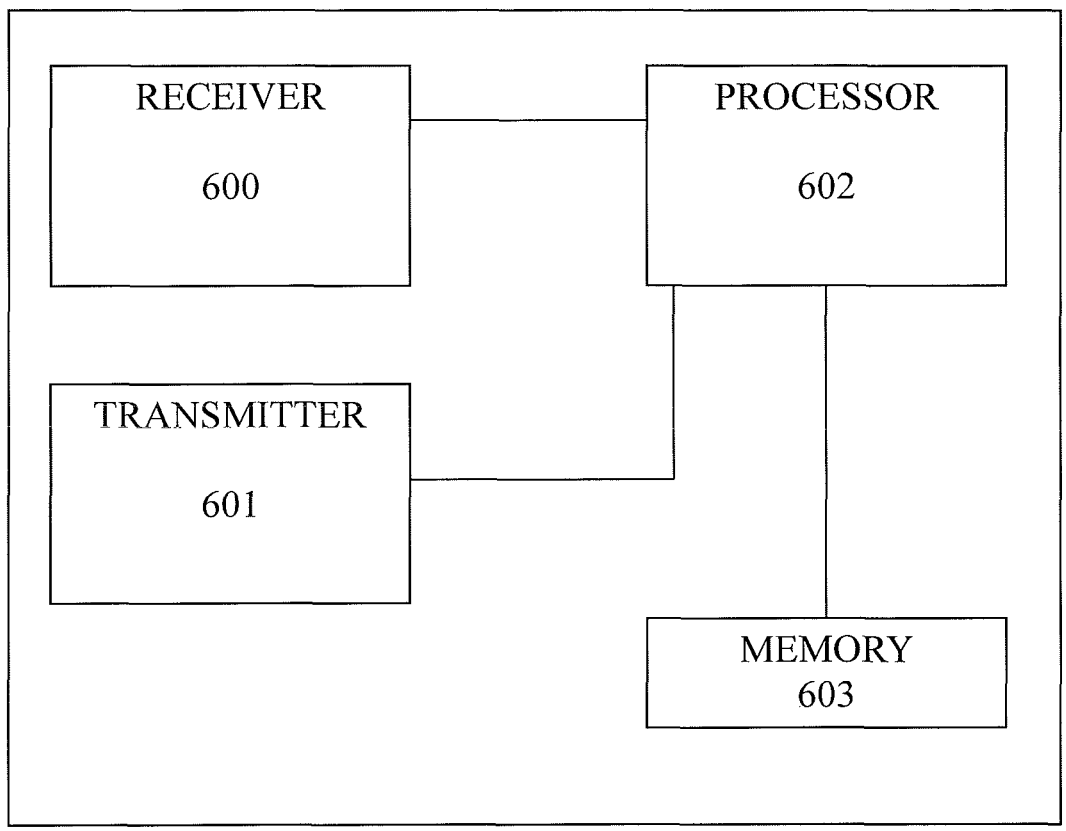
FIG. 6 shows a schematic diagram of an embodiment of a global navigation satellite system receiver.

It will be appreciated that the above methods, algorithms, calculation and/or steps may be executed by a processor residing on the GNSS receiver 100. FIG. 6 shows an example of the GNSS receiver 100 comprising such a processor. The GNSS receiver 100 has a receiver 600 and transmitter 601 each coupled to the processor 602. The processor 602 is further coupled to a memory 603. The processor may be capable of calculating the first and second position according to the first and second branches of FIGS. 3 and 4 and determining whether received orbit data is valid. The processor 602 may be capable of carrying out the above defined method steps of the GNSS receiver 100.

Figure 7:
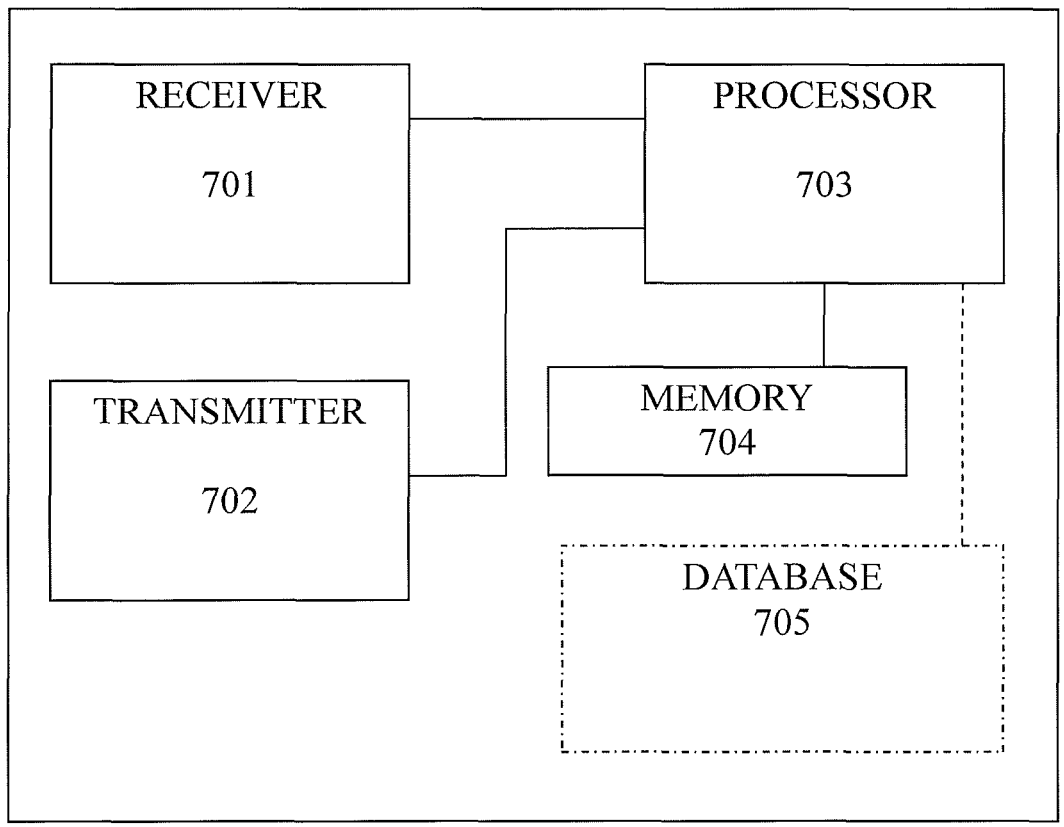
FIG. 7 shows a schematic diagram of an embodiment of a data receiver.

FIG. 7 shows a data receiver 130 that may be implemented in embodiments. Data receiver has a receiver 701. Receiver 701 may be capable of receiving an indication that a GNSS receiver may received spoof data. Receiver 701 may be capable of receiving a positional data of a GNSS receiver 100. It will be appreciated that the receiver 701 may receive this information directly from the GNSS receiver 100 or from another entity. Receiver 130 may pass such information to a processor 703 which may be capable of carrying out any of the method steps described associated with data receiver 130.

The processor 703 receiving the determined position of the GNSS receiver 100 may be capable of checking if the position falls within a specified area, for example a congestion charge area, and generate an electronic fee which may be billed a user of the GNSS receiver 100. The processor 703 may access information such information associated with an area from memory 74. Alternatively or in addition, the position signal may be tracked to build up an accumulated database 705. This database may be used to determine for example insurance or road tax based on use.

The processor 703 receiving an indication of the validity of the orbit data may raise an alert if it is indicated the orbit data signal is invalid. This alert may be transmitted via transmitter 702. Alternatively, where a probability of the invalidity of the orbit data is transmitted, the data receiver 130 may build up a profile of the probability of invalidity and determine whether the orbit data is being spoofed based on the frequency of higher probability. This information may be stored in memory 704 or database 705. It will be appreciated that database 705 may not form part of data receiver 130 and may be in communication with data receiver 130.

Although the foregoing description has been described in relation to general GNSS application, it will be appreciated that it may be adapted to be applied specifically to any of GPS, Galileo, Glonass, Compass and any other GNSS system. For example, although the specific structure of the orbit data and resulting parameters and choice of equations and algorithms may be system dependent, embodiments may be applied to these variations.

For example, when embodiments are applied to GPS, the orbit data may be ephemeris data, the time at which the ephemeris data is received will be $T_{OE}$ (time of ephemeris) and the initial time may be at $T_{OE}$ minus 2 hours with the final position being at $T_{OE}$ plus 2 hours. Similar adaptations may be made to apply embodiments to other GNSS systems.

Although the GNSS receiver 100 has been described as transmitted its calculated position to data receiver 130, it will be appreciated that the GNSS receiver 100 may be capable of transmitting its calculated position to more than one data receiver and may differentiate between data receivers based on the type of data being transmitted.

Although the GNSS receiver 100 is described as transmitting its calculated position, it will be appreciated that in some application the GNSS receiver may transmit only an indication that a certain area has been entered, For example that a vehicle has entered an area such as a congestion charge area.

Throughout the description the position or positional data of a GNSS receiver is referred to. It will be appreciated that this position or positional data may include both the physical position and the velocity of the GNSS receiver 100 or satellite 120.

The invention is being described herein by way of reference to particular non-limiting examples. One skilled in the art will understand the general applicability of the invention. The scope of protection afforded by the invention is defined in the appended claims.

What is claimed is:

1. A method performed by a processor device within a global navigation satellite system receiver, comprising:
    calculating a satellite first position at a first time in dependence on received orbit data corresponding to a global navigation satellite orbit path;
    modeling a global navigation satellite orbit path from the satellite first position at the first time to a second time to determine a modeled second position of the satellite at the second time;
    calculating a satellite second position at the second time in dependence on the received orbit data;
    comparing said modeled second position and said satellite second position; and
    identifying whether the received orbit data is valid orbit data based on the result of said comparing.

2. The method of claim 1 wherein said orbit data comprises orbit parameters for predicting an orbit path of a global navigation satellite for a segment of flight.

3. The method of claim 1 wherein said modeling is based on an orbit propagation model.

4. The method of claim 3 wherein said orbit propagation model takes into account the effects of at least one of: at least one gravitational body and solar pressure on the orbit path.

5. The method of claim 1 wherein said orbit data is received at a third time which falls within a period for which the orbit data describes a segment of the global navigation satellite's orbit path.

6. The method of claim 5 wherein said first time is a time before said third time at which the orbit data is received and said second time is a time after said third time.

7. The method of claim 5 wherein said first time is the start of the period for which the orbit data describes a segment of the global navigation satellite's orbit path and the second time is the end time of the period for which the orbit data describes a segment of the global navigation satellite's orbit path and wherein said satellite first position is a position at the start of the period for which the orbit data describes a segment of the global navigation satellite's orbit path and said modeled second position and satellite second position are projected positions at the end of the period for which the orbit data describes a segment of the global navigation satellite's orbit path.

8. The method of claim 5 wherein the satellite first and second positions are calculated using position and velocity equations with orbit parameters from the orbit data as input parameters.

9. The method of claim 1 wherein comparing said modeled second position and satellite second position comprises:
    determining an error corresponding to a difference between the modeled second position and the satellite second position.

10. The method of claim 9 further comprising identifying said orbit data as being invalid if the determined error exceeds a threshold.

11. The method of claim 10 further comprising generating a signal comprising information indicative of whether the orbit data is invalid.

12. A computer readable medium including computer instructions for:
    calculating a satellite first position at a first time in dependence on received orbit data corresponding to a global navigation satellite orbit path;
    modeling a global navigation satellite orbit path from the satellite first position at the first time to a second time to determine a modeled second position of the satellite at the second time;
    calculating a satellite second position at the second time in dependence on the received orbit data;
    comparing said modeled second position and said satellite second position; and
    identifying whether the received orbit data is valid orbit data based on the result of said comparing.

13. An apparatus comprising:
    a processor configured to:
        calculate a satellite first position at a first time in dependence on received orbit data corresponding to a global navigation satellite an orbit path;
        model a global navigation satellite orbit path from the satellite first position at the first time to a second time to determine a modeled second position of the satellite at the second time;

calculate an actual satellite second position at the second time in dependence on the received orbit data;

compare said modeled second position and said satellite second position; and identify whether the received orbit data is valid orbit data based on the result of said comparing.

14. The apparatus of claim 13 wherein said orbit data comprises orbit parameters for predicting an orbit path of a global navigation the satellite for a segment of flight.

15. The apparatus of claim 13 wherein said modeling is based on an orbit propagation model.

16. The apparatus of claim 15 wherein said orbit propagation model takes into account the effects of at least one of: at least one gravitational body and solar pressure on the orbit path.

17. The apparatus of claim 13 wherein said orbit data is received at a third time which falls within a period for which the orbit data describes a segment of the global navigation satellite's orbit path.

18. The apparatus of claim 17 wherein said first time is a time before said third time at which the orbit data is received and said second time is a time after said third time.

19. The apparatus of claim 17 wherein said first time is the start of the period for which the orbit data describes a segment of the global navigation satellite's orbit path and the second time is the end time of the period for which the orbit data describes a segment of the global navigation satellite's orbit path and wherein said satellite first position is a position at the start of the period for which the orbit data describes a segment of the global navigation satellite's orbit path and said modeled second position and satellite second position are projected positions at the end of the period for which the orbit data describes a segment of the global navigation satellite's orbit path.

20. The apparatus of claim 17 wherein the satellite first and second positions are calculated using position and velocity equations with orbit parameters from the orbit data as input parameters.

21. The apparatus of claim 13 configured to compare said modeled second position and satellite second position by determining an error corresponding to a difference between the modeled second position and the satellite second position.

22. The apparatus of claim 21 further configured to identify said orbit data as being invalid if the determined error exceeds a threshold.

23. The apparatus of claim 22 further configured to generate a signal comprising information indicative of whether the orbit data is invalid.

24. An apparatus comprising:

a receiver configured to receive global navigation satellite orbit data; and a processing device coupled to the receiver and configured to calculate a first position of a global navigation satellite at a first time in dependence on the received global navigation satellite orbit data, model an orbit path of the global navigation satellite from the first position at the first time to a second time to determine a modeled second position of the global navigation satellite at the second time, calculate an actual second position of the global navigation satellite at the second time in dependence on the received global navigation satellite orbit data, compare said modeled second position and said actual second position and determine from the comparison whether said global navigation satellite orbit data is valid.

* * * * *

UNITED STATES PATENT AND TRADEMARK OFFICE
CERTIFICATE OF CORRECTION

PATENT NO.           : 8,633,852 B2                                          Page 1 of 1
APPLICATION NO.      : 13/237611
DATED                : January 21, 2014
INVENTOR(S)          : Peter Bagnall It is certified that error appears in the above-identified patent and that said Letters Patent is hereby corrected as shown below:

In the Claims:

At column 10, claim number 13, line number 63, please delete the word "an".

At column 11, claim number 14, line number 9, please delete the word "the".

Signed and Sealed this
Eighth Day of April, 2014

Michelle K. Lee
*Deputy Director of the United States Patent and Trademark Office*